(12) United States Patent
Gao et al.

(10) Patent No.: US 7,844,555 B2
(45) Date of Patent: Nov. 30, 2010

(54) RANKER SELECTION FOR STATISTICAL NATURAL LANGUAGE PROCESSING

(75) Inventors: Jianfeng Gao, Kirkland, WA (US); Galen Andrew, Redmond, WA (US); Mark Johnson, Providence, RI (US); Kristina Toutanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 11/938,811

(22) Filed: Nov. 13, 2007

(65) Prior Publication Data

US 2009/0125501 A1    May 14, 2009

(51) Int. Cl.
  *G06F 15/18* (2006.01)
  *G06E 1/00* (2006.01)
  *G06E 3/00* (2006.01)
  *G06G 7/00* (2006.01)
  *G06N 3/02* (2006.01)

(52) U.S. Cl. ...................................................... 706/15
(58) Field of Classification Search .................... 706/15
    See application file for complete search history.

(56) References Cited

U.S. PATENT DOCUMENTS

| | | | |
|---|---|---|---|
| 5,477,451 A | 12/1995 | Brown et al. | |
| 6,609,094 B1 | 8/2003 | Basu et al. | |
| 7,139,703 B2 | 11/2006 | Acero et al. | |
| 7,219,035 B2 | 5/2007 | Goodman | |
| 7,685,276 B2 * | 3/2010 | Konig et al. | 709/224 |
| 7,698,328 B2 * | 4/2010 | Sachs et al. | 707/706 |
| 7,702,611 B2 * | 4/2010 | Chi et al. | 707/999.001 |
| 7,711,672 B2 * | 5/2010 | Au | 706/55 |
| 2002/0188421 A1 | 12/2002 | Tanigaki et al. | |
| 2005/0021317 A1 | 1/2005 | Weng et al. | |
| 2006/0074630 A1 | 4/2006 | Chelba et al. | |
| 2007/0162272 A1 | 7/2007 | Koshinaka | |

OTHER PUBLICATIONS

Extracting Chinese multi-word terms from small corpus, Zhou Lang; Zhang Liang; Feng Chong; Huang Heyan; Intelligent System and Knowledge Engineering, 2008. ISKE 2008. 3rd International Conference on vol. 1 Digital Object Identifier: 10.1109/ISKE.2008. 4731041 Publication Year: 2008 , pp. 813-818.*

(Continued)

*Primary Examiner*—Michael Holmes
(74) *Attorney, Agent, or Firm*—Alleman Hall McCoy Russell & Tuttle LLP

(57) ABSTRACT

Systems and methods for selecting a ranker for statistical natural language processing are provided. One disclosed system includes a computer program configured to be executed on a computing device, the computer program comprising a data store including reference performance data for a plurality of candidate rankers, the reference performance data being calculated based on a processing of test data by each of the plurality of candidate rankers. The system may further include a ranker selector configured to receive a statistical natural language processing task and a performance target, and determine a selected ranker from the plurality of candidate rankers based on the statistical natural language processing task, the performance target, and the reference performance data.

20 Claims, 2 Drawing Sheets

OTHER PUBLICATIONS

The RWTH Arabic-to-English spoken language translation system, Bender, O.; Matusov, E.; Hahn, S.; Hasan, S.; Khadivi, S.; Ney, H.; Automatic Speech Recognition & Understanding, 2007. ASRU. IEEE Workshop on Digital Object Identifier: 10.1109/ASRU.2007.4430145 Publication Year: 2007, pp. 396-401.*

Chinese Typed Collocation Extraction using Corpus-based Syntactic Collocation Patterns, Wanyin Li; Qin Lu; Liu, J.; Natural Language Processing and Knowledge Engineering, 2007. NLP-KE 2007. International Conference on Digital Object Identifier: 10.1109/NLPKE.2007.4368039 Publication Year: 2007, pp. 248-255.*

Collins, "Parameter Estimation for Statistical Parsing Models", 2001, pp. 1-38.

Klein, et al., "Conditional Structure versus Conditional Estimation in NLP Models", In Workshop on Empirical Methods in Natural Language Processing (EMNLP), 2002, pp. 1-8.

Malouf, "A Comparison of Algorithms for Maximum Entropy Parameter Estimation", In Sixth Conf. on Natural Language Learning, 2002, pp. 1-7.

* cited by examiner

RANKER SELECTION FOR STATISTICAL NATURAL LANGUAGE PROCESSING

BACKGROUND

Statistical natural language processing (SNLP), which employs statistical techniques to automatically generate and analyze natural human languages, often requires parameter estimation for various statistical models employed for performing SNLP tasks. To achieve this end, various parameter estimation algorithms have been used. However, each parameter estimation algorithm may perform differently when applied to different types of SNLP tasks. Further, performance targets, such as training time, runtime speed, memory footprint, and accuracy, may vary depending on the type of application under development. For example, a web-based application may utilize frequent updates of the statistical model and a large memory footprint, while a mobile device application may utilize less frequent updates and a small memory footprint. These variations make it difficult for a software developer to select an appropriate parameter estimation algorithm for each project.

Selection of a parameter estimation algorithm that does not perform well for a particular SNLP problem can be undesirably time consuming, resulting in wasted processing time. Current systems are unable to suitably predict performance of a parameter estimation algorithm for different types of SNLP task. Therefore it is difficult for developers to select a parameter estimation algorithm suitable to a particular SNLP task.

SUMMARY

Systems and methods for selecting a ranker for statistical natural language processing are provided. One disclosed system includes a computer program configured to be executed on a computing device, the computer program comprising a data store including reference performance data for a plurality of candidate rankers, the reference performance data being calculated based on a processing of test data by each of the plurality of candidate rankers. The system further includes a ranker selector configured to receive a SNLP task and one or more performance targets, and determine a selected ranker from the plurality of candidate rankers based on the natural language processing task, the performance targets and the reference performance data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
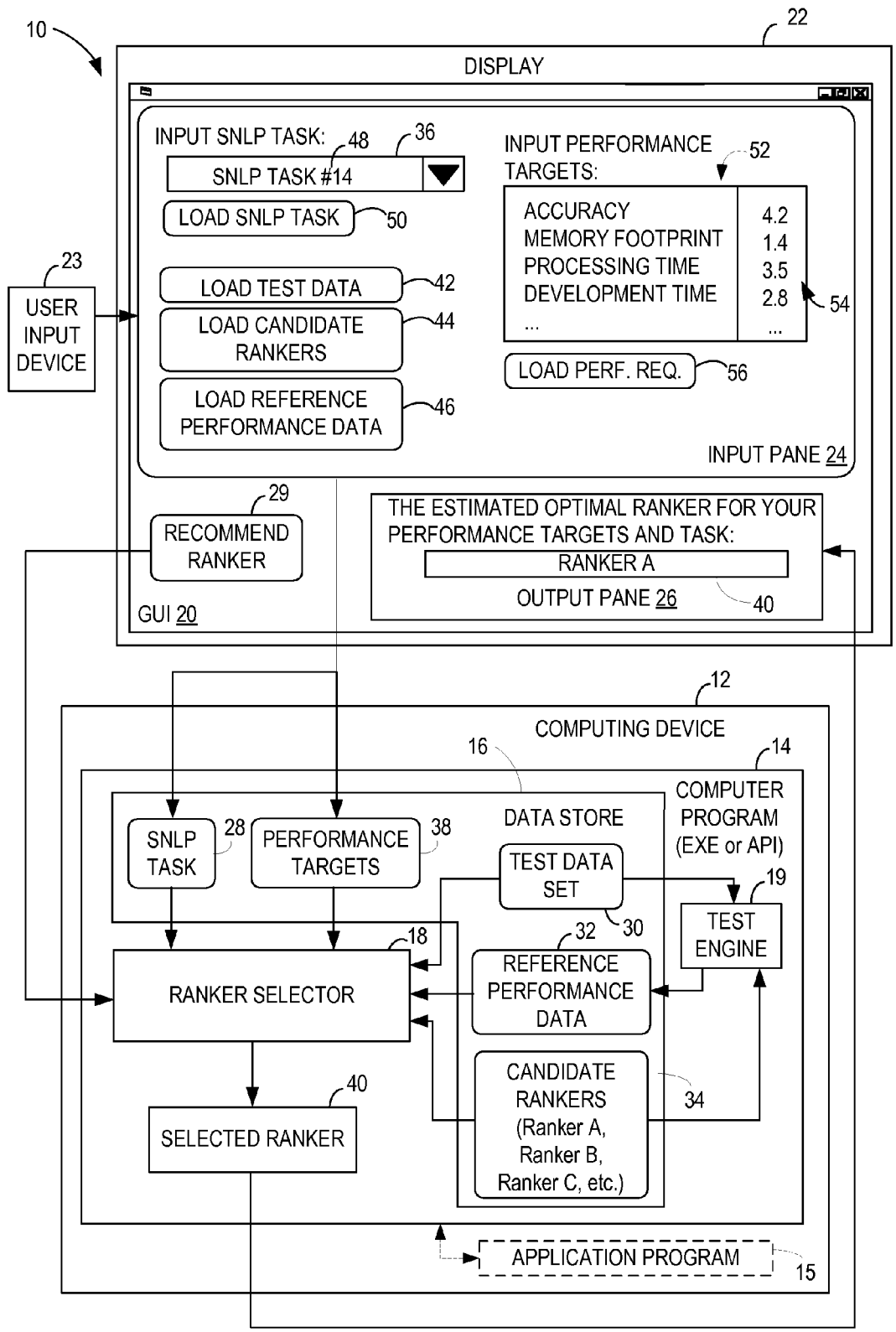
FIG. 1 is a schematic view of an embodiment of a system for selecting a ranker including a parameter estimation algorithm for statistical natural language processing.

FIG. 1 illustrates a system 10 for selecting ranker including a parameter estimation algorithm, for use in statistical natural language processing. The system 10 includes a computing device 12 configured to execute a computer program 14 for use by a user, such as a software developer, to aid in selecting a ranker for statistical natural language processing during software development. The computer program 14, for example, may be a stand-alone executable program, or alternatively, may be an application programming interface (API) configured to interface with an application program 15, such as a software development application.

The computer program 14 may include a data store 16 and a ranker selector 18. The data store 16 is configured to store, either temporarily or in a nonvolatile manner, a plurality of candidate rankers 34, as well as reference performance data 32 for each of the plurality of candidate rankers 34, and a test data set 30 to measure the relative performance of each of the candidate rankers 34. The test data set 30, for example, may include a sample of untranslated texts and corresponding verified translations (also referred to as reference translations).

The candidate rankers 34 may be any suitable rankers used for parameter estimation for statistical natural language models for performing natural language processing tasks. For example, the plurality of candidate rankers 34 may include: (1) maximum entropy estimation with L2 regularization (MEEL2) ranker using maximum entropy estimation with L2 regulation (MEEL2) algorithm, (2) maximum entropy estimation with L1 regularization (MEEL1) ranker using maximum entropy estimation with L1 regulation (MEEL1) algorithm, (3) averaged perceptron (AP) ranker using an averaged perceptron (AP) algorithm, (4) Boosting ranker using a Boosting algorithm, and (5) BLasso ranker using a Boosting with Lasso with L1 regularization (BLasso) algorithm, as explained in detail below.

The computer program 14 may further include a test engine 19 configured to calculate the reference performance data 32 for each of the plurality of candidate rankers 34 based on a processing of the test data set 30. The test engine 19 may be configured to cause each candidate ranker 34 to utilize its SNLP algorithms to output ranked translation alternatives. Each candidate ranker 34 may be judged for accuracy, memory footprint, processing time, and development time, and other factors, against a verified translation, and the result saved as reference performance data 32.

It will be appreciated that the test engine 19 may calculate the reference performance data 32 at some point in time prior to when a user is selecting a candidate ranker 34 with system 10, and that the test engine 19 and test data set 30 may be located on a different computing device than computing device 12. For example, the reference performance data 32 may be preloaded data that is calculated using a test engine 19 located at a manufacturer of computer program 14, and distributed by download or CD ROMs with the computing program 14.

The ranker selector 18 is configured to receive a statistical natural language processing (SNLP) task 28 and one or more performance targets 38 from the user, and determine a selected ranker 40 from the plurality of candidate rankers 34 based on the SNLP task 28 and the performance targets 38 received from the user, and the reference performance data 32 that has been calculated by test engine 19.

The SNLP task 28 may be any suitable task in statistical natural language processing that can be formulated as a ranking problem under the framework of a linear model. Example SNLP tasks 28 include but are not limited to, parse selection, language model adaptation, word segmentation, part-of-speech tagging, text categorization, text clustering, lexical acquisition, word-sense disambiguation, word class induction, syntactic parsing, semantic interpretation, grammar induction, machine translation, and combinations of the above.

The performance targets 38 may include any suitable performance targets for statistical natural language processing, including but not limited to accuracy, memory footprint, processing time, development time, model sparsity, model training time, etc.

The determination of the selected ranker 40 by the ranker selector 18 may be carried out, for example, by comparing the performance targets 38 with the reference performance data 32 for the plurality of candidate rankers 34. A candidate ranker of the plurality of candidate rankers 34 having the reference performance data 32 meeting the performance targets 38 and/or performing superiorly as compared to the other candidate rankers 34 based on the performance targets 38, may be selected as the selected ranker 40.

The computer program 14 may be configured to display a graphical user interface (GUI) 20 on a display 22 associated with the computing device 12. The GUI 20 may include a user input pane 24 configured to receive user input of various parameters via a user input device 23, an output pane 26, and a recommend ranker selector 29. Upon selection of the recommend ranker selector 29 by a user, the computer program 14 is configured to determine the recommended ranker 40 based on the user input and to display the recommended ranker 40 in the output pane 26.

The user input pane 24 of the GUI 20 may be configured to display an SNLP task input tool 36 configured to receive user input indicating the SNLP task 28, and a performance targets input tool 52 configured to receive user input indicating one or more performance targets 38 for the SNLP task 28. The SNLP task input tool 36 may be configured to display an SNLP task dropdown list including one or more SNLP task options 48 to be selected by the user. Alternatively, a task input tool 36 of another form may be used, such as a text input field, etc. SNLP task input tool 36 may further include a load SNLP task tool 50, by which a user may load a data file containing one or more stored SNLP tasks, for example.

The load performance target tool 52 may include a list of performance targets and associated user editable values 54 corresponding to one or more of the listed performance targets. In the depicted embodiment, the performance targets are illustrated as accuracy, memory footprint, processing time, and development time. It will be understood that other suitable performance targets may also be utilized, as listed above. A load performance targets tool 56 may also be provided, by which a user may load a data file containing one or more stored performance targets, for example.

The user input pane 24 of the GUI 20 may also include a test data input tool 42 configured to receive user input of the test data 30. The user input pane 24 may further include an load candidate ranker tool 44 configured to receive user input of the plurality of candidate rankers 34, and a load reference performance data tool 46 configured to receive user input of the reference performance data 32. Test data input tool 42, load candidate ranker tool 44, and load reference performance data tool 46 are depicted as buttons, which upon selection by a user, present a browsing menu through which a user may select an appropriate data file to load. Alternatively, other selection mechanisms may be utilized.

Upon input of the SNLP task 28 via SNLP task input tool 36 and performance targets 38 via a targets input tool 52, and input of any desired test data 30, reference performance data 32 or candidate rankers 34 via load test data tool 42, load reference performance data tool 46, and load candidate ranker tool 44, respectively, the recommend ranker selector 29 of the GUI 20 may be selected by a user. Upon selection, the GUI 20 is configured to send a request to the ranker selector 18 to cause the ranker selector 18 to determine a selected ranker 40 from the plurality of candidate rankers 34 based on the SNLP task 28 and the performance targets 38. The selected ranker 40 selected by the ranker selector 18 may be displayed in the output pane 26 of the GUI 20.

Using such a system, a software developer may efficiently select a ranker having a parameter estimation algorithm suitable to a particular SNLP task and particular performance targets.

Figure 2:
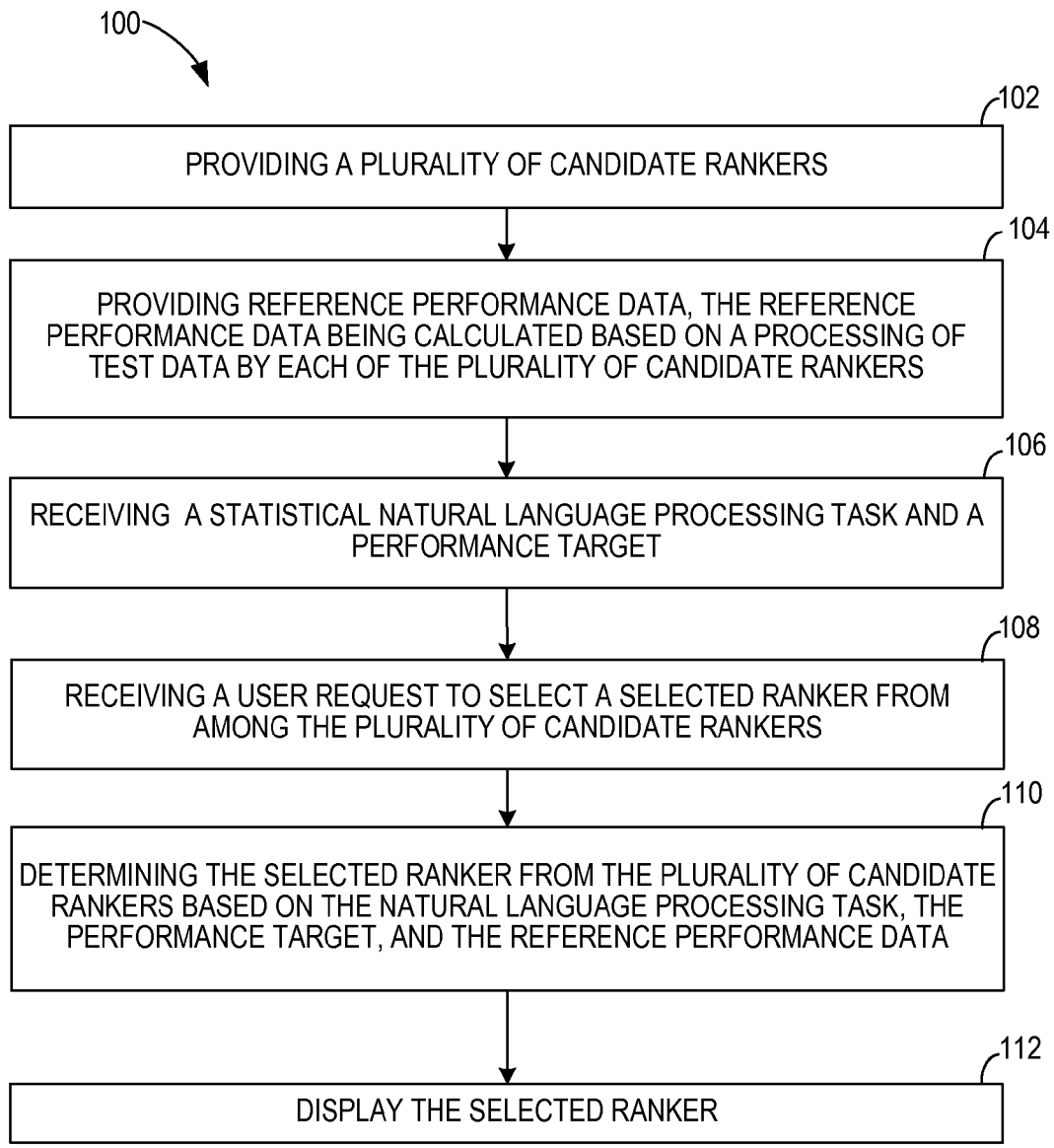
FIG. 2 is a flowchart of an embodiment of a method for selecting a ranker including a parameter estimation algorithm from a plurality of candidate rankers that can be implemented in the system of FIG. 1.

FIG. 2 is a flowchart of an embodiment of a method 100 for selecting a ranker from a plurality of candidate rankers. The method 100 may be implemented, for example, via the computer program 14 executed on the computing device 12, described above, or via other suitable programs and devices.

The method may include, at 102, providing a plurality of candidate rankers. Each of the candidate rankers may include a parameter estimation algorithm for SNLP models that perform SNLP tasks. The plurality of candidate rankers may include predefined candidate rankers provided with the computer program 14 and stored in the data store 16. In some examples, the plurality of candidate rankers 34 may include user defined candidate rankers received from user input via for example the GUI 20 of the system 10 in FIG. 1. The plurality of candidate rankers may include any number of suitable rankers for statistical natural language model parameter estimation, including: maximum entropy estimation with L2 regularization (MEEL2) ranker using a maximum entropy estimation with L2 regulation (MEEL2) algorithm, averaged perceptron (AP) ranker using an averaged perceptron (AP) algorithm, Boosting ranker using a Boosting algorithm, and/or BLasso ranker using a Boosting with Lasso with L1 regularization (BLasso) algorithm.

At 104, the method may include providing reference performance data, the reference performance data being calculated based on a processing of test data by each of the plurality of candidate rankers. The test data may include predefined test data provided by the manufacturer of computer program 14, for example, and stored in the data store 16, and/or may include user defined test data received from user input via a GUI, as described above. Likewise, the reference performance data may be predefined reference performance data provided by the manufacturer of computer program 14 and stored in a data store of the computer program, or the reference performance data may be user defined reference performance data received from user input via a GUI, for example.

At 106, the method may include receiving an SNLP task and one or more performance targets. The SNLP and performance targets may be received, for example, via a GUI as described above. Examples of suitable SNLP tasks and performance targets are provided above.

At 108, the method may include receiving a user request to select a selected ranker from among the plurality of candidate rankers, for example via a recommend ranker selection mechanism of a GUI. At 110, the method may include determining the selected ranker, via for example a ranker selector, from the plurality of candidate rankers based on the SNLP task, the performance target, and the reference performance data.

Determining the selected ranker from the plurality of candidate rankers may include comparing a measured parameter from the reference performance data for each of the plurality of candidate rankers with a desired parameter from the performance targets. In one example, the SNLP task may be received from user input received via an SNLP task input tool of a GUI, and the performance target may be received from user input received via a performance targets input tool of a GUI, as described above.

Determining the selected ranker at 110 may further include comparing the performance target with the reference performance data of a candidate ranker of the plurality of candidate rankers in performing a particular SNLP task. A candidate ranker of the plurality of candidate rankers may be selected as the selected ranker if the reference performance data of that candidate ranker in performing one or more SNLP tasks meets the performance targets received the user input.

As 112, the method may further include displaying the selected ranker on a display associated with the computing device.

The above described method may be utilized by a software developer to efficiently select a ranker having a parameter estimation algorithm suitable to a particular SNLP task and particular performance targets. The above described systems and methods may enable a user, such as a software developer, to select a ranker that is suited to a particular SNLP task based on the user's specific performance targets, such as model training time, runtime speed, memory footprint, and accuracy. Thus, for example, for applications that are web-based, and which have rapid model updates as a performance target, the ranker selector may be configured to select a selected ranker that may be trained and updated quickly. The averaged perceptron ranker may be selected under these circumstances. For applications for which accuracy is a performance target, the ME/L2 ranker may be chosen, and for applications for which a small memory footprint is a performance target, the ME/L1, may be chosen. Finally, for applications that have a very small memory footprint as a performance target and that may be able to sacrifice some accuracy, the ranker selector may be configured to choose the BLasso or Boosting ranker.

EXAMPLES

Examples of various example parameter estimation algorithms that may be used for performing parameter estimation in generating SNLP models are illustrated as follows and in reference to a hypothetical linear statistical natural language processing model F(x) for performing an SNLP task, such as parsing.

F(x) may be represented by the following equation:

$$F(x) = \arg\max_{y \in GEN(x)} \Phi(x, y) \cdot w$$

where GEN(X) is a procedure for generating all candidate y for each input x, $\Phi(x, y)$ is the various extracted features, and w is a parameter vector that assigns a real-valued weight to each of the extracted features $\Phi(x, y)$.

The task of a parameter estimation algorithm is to use a set of training samples to choose a parameter w, such that the mapping F(x) is capable of correctly classifying an unseen example.

1. Maximum Entropy Estimation with L2 Regularization Algorithm

The maximum entropy estimation with L2 regularization (MEEL2) algorithm for parameter estimation operates by finding a parameter w where the sum of empirical loss on the training set, as represented by L(w), and a regularization term, as represented by R(w), is minimum, with $R(w) = \alpha \Sigma_j w_j^2$. The MEEL2 algorithm may be represented by the following equation:

$$\hat{w} = \operatorname{argmin}_w \{L(w) + R(w)\}, \text{ where}$$

$$L(w) = -\sum_{i=1}^{n} \log P(y_i \mid x_i)$$

$$R(w) = \alpha \sum_{j} w_j^2, \text{ where}$$

$$P(y \mid x) = \frac{\exp(\Phi(x, y) \cdot w)}{\sum_{y' \in GEN(x)} \exp(\Phi(x, y') \cdot w)}$$

2. Maximum Entropy Estimation with L1 Regularization Algorithm

The maximum entropy estimation with L1 regularization (MEEL1) algorithm used for parameter estimation operates by finding a parameter w where the sum of empirical loss on the training set, as represented by L(w), and a regularization term, as represented by R(w), is minimum, but with $R(w) = \alpha \Sigma_j |w_j|$. The MEEL1 algorithm may be represented by the following equation:

$$\hat{w} = \operatorname{argmin}_w \{L(w) + R(w)\}, \text{ where}$$

$$L(w) = -\sum_{i=1}^{n} \log P(y_i \mid x_i)$$

$$R(w) = \alpha \sum_{j} |w_j|, \text{ where}$$

$$P(y \mid x) = \frac{\exp(\Phi(x, y) \cdot w)}{\sum_{y' \in GEN(x)} \exp(\Phi(x, y') \cdot w)}$$

An orthant-wise limited-memory quasi-Newton (OWL-QN) algorithm, which is a modification of L-BFGS, may be used to iteratively minimize the objective function L(w)+R(w). In the OWL-QN algorithm, an L-BFGS algorithm is used to approximate the Hessian of the loss function, as indicated by L(w), which is then used to approximate the objective function L(w)+R(w) for a given orthant. When the L-BFGS algorithm is used to approximate the Hessian of the loss function, L(w), the L-BFGS algorithm maintains vectors of the change in gradient $g_k - g_{k-1}$ from the most iterations, and uses them to construct an estimate of the inverse Hessian $H^{-1}$. At each step, a search direction is chosen by minimizing a quadratic approximation to the function:

$$Q(x) = \frac{1}{2}(x - x_0)' H(x - x_0) + g_0'(x - x_0)$$

where $x_0$ is the current iterate, and $g_0$ is the function gradient at $x_0$. If H is positive definite, the minimizing value of x can be computed analytically according to $x^* = x_0 - H^{-1} g_0$.

3. Boosting Algorithm

The Boosting algorithm optimizes or minimizes a pairwise exponential loss function, ExpLoss(w), which is defined as follows:

$$\operatorname{ExpLoss}(w) = \sum_{i} \sum_{y_i \in GEN(x_i)} \exp(-M(y_i, y_j))$$

Given a training sample $(x_i, y_i)$, for each possible output $y_j$ in $GEN(x_i)$, the margin of the pair $(x_i, y_i)$ with respect to a model w, $M(y_i, y_j)$, is provided by the following equation:

$$M(y_i,y_j)=\Phi(x_i,y_j)\cdot w - \Phi(x_i,y_i)\cdot w$$

The Boosting algorithm may use the following incremental feature selection procedure:

1. Set $w_0 = \arg\min_{w_0} ExpLoss(w)$; and $w_0 = 0$ for $d=1 \ldots D$
2. Select a feature $f_{k*}$ which has the largest estimated impact on reducing $$ExpLoss(w) = \sum_i \sum_{y_j \in GEN(x_i)} \exp(-M(y_i, y_j))$$

3. Update $\lambda_{k*} \leftarrow \lambda_{k*} + \delta^*$, and return to Step 2.

After initialization, Steps 2 and 3 are repeated a predefined T number of times. At each iteration, a feature is chosen and its weight is updated.

First, define $Upd(w,k,\delta)$ is defined as an updated model, with the same parameter values as w with the exception of $w_k$, which is incremented by $\delta$:

$$Upd(w,k,\delta)=(w_1, \ldots, w_k+\delta, \ldots, w_D)$$

Then, Steps 2 and 3 may be rewritten as the following equations, respectively:

$$(k^*,\delta^*)=\arg\min_{k,\delta} ExpLoss(Upd(w,k,\delta))$$

$$w^t = Upd(w^{t-1}, k^*, \delta^*)$$

No regularization function is used in the Boosting algorithm, but a small fixed step size $\epsilon$ may be used to as an implicit regularization to minimize over fitting and number of test errors.

4. Boosted Lasso(BLasso) Algorithm

The BLasso algorithm optimizes an $L_1$ regularized exponential loss function and may be represented as follows:

$$LassoLoss(w)=ExpLoss(w)+R(w), \text{ where}$$

$$R(w)=\alpha\Sigma_j |w_j|.$$

An incremental feature selection procedure similar to that used by the Boosting algorithm is used to learn parameter vector w. At each iteration, the BLasso algorithm takes either a forward step or a backward step. At each forward step, a feature is selected and its weight is updated according to the following equations:

$$(k^*,\delta^*)=\arg\min_{k,\delta=\pm\epsilon} ExpLoss(Upd(w,k,\delta))$$

$$w^t = Upd(w^{t-1}, k^*, \epsilon \times sign(\delta^*))$$

The exponential loss function LassoLoss(w) may be calculated with an update of either $+\epsilon$ or $-\epsilon$, i.e., grid search may be used for feature weight estimation.

At each backward step, a feature is selected and the absolute value of its weight is reduced by $\epsilon$ if and only if it leads to a decrease of the exponential loss function LassoLoss(w), as shown in the following equations:

$$k^*=\arg\min_{k:w_k \neq 0} ExpLoss(Upd(w,k,-\epsilon sign(w_k))$$

$$w^t = Upd(w^{t-1}, \alpha^{t-1}) - LassoLoss(w^t, \alpha^t) > \theta$$

where $\theta$ is a tolerance parameter.

The BLasso algorithm may use the following incremental training procedure:

1. Initialize $w^0$: set $w_0 = \arg\min_{w^0} ExpLoss(w)$, and $W_d = 0$ for $d=1 \ldots D$.

2 Take a forward step according to the following equations and the updated model is denoted by $w^1$:

$$(k^*,\delta^*)=\arg\min_{k,\delta=\pm\epsilon} ExpLoss(Upd(w,k,\delta))$$

$$w^t = Upd(w^{t-1}, k^*, \epsilon \times sign(\delta^*))$$

3. Initialize $\alpha=(ExpLoss(w^0)-ExpLoss(w^1))/\epsilon$

4. Take a backward step if and only if it leads to a decrease of LassoLoss according to the following equations:

$$k^*=\arg\min_{k:w_k \neq 0} ExpLoss(Upd(w,k,-\epsilon sign(w_k))$$

$$w^t = Upd(w^{t-1}, \alpha^{t-1}) - LassoLoss(w^t, \alpha^t) > \theta$$

where $\theta=0$; otherwise

5. Take a forward step according to Step 2 above; update $\alpha = \min(\alpha, (ExpLoss(w^{t-1}) - ExpLoss(w^t))/\epsilon$; and return to Step 4 above.

5. Averaged Perceptron

The averaged perceptron algorithm optimizes a minimum square error (MSE) loss function. The averaged perceptron algorithm may use the following incremental training procedure:

1. Set $w_0 = 1$ for $w_d = 0$ for $d=1 \ldots D$
2. For $t=1 \ldots T$ (T=the total number of iterations)
3. For each training sample $(x_i, y_i)$, $i=1 \ldots N$
4. Choose an optimum candidate $z_i$ from $GEN(x_i)$ using the current model w, $$z_i = \underset{z \in GEN(x\_i)}{\arg\max} \Phi(x_i, z) \cdot w$$

5. $w = w + \eta(\Phi(x_i, y_i) - \Phi(x_i, z)) \cdot w$, where $\eta$ is the size of learning step, optimized on held-out data.

The averaged perceptron algorithm starts with an initial parameter setting and updates it for each training example. If $w^{t,i}$ is the parameter vector after the $i^{th}$ training sample has been processed in pass t over the training data, the averaged parameters are defined as $$\bar{w} = \frac{1}{TN} \sum_t \sum_i w^{t,i},$$

where T is the number of epochs, and N is the number of training samples.

Example devices that may be used as computing device 12 include devices that electronically execute one or more programs, including but not limited to personal computers, servers, laptop computers, hand-held devices, portable data assistant (PDA), cellular phones and other micro-processor-based programmable consumer electronics and/or appliances, routers, gateways, hubs and other computer networking devices, etc. The computing device 12 may typically include a processor connected via a bus to volatile memory (e.g., Random Access Memory), non-volatile memory (e.g., Read Only Memory), and a mass storage device (e.g., a hard drive). The computing device also may include user input devices such as a mouse and keyboard, a display device, and a media drive configured to read media, such as a Compact Disk-Read Only Memory (CD-ROM) or Digital Video Disk-Read Only Memory (DVD-ROM). Software programs including executable code for implementing the embodiments described herein may be stored and distributed on media, loaded onto the computing device 12 via the media drive, saved on the mass storage device, and executed using the processor and portions of volatile memory. The computer program 14 may be an application programming interface (API) configured to be a communication intermediary between an application program and the ranker selector 18.

The computer program 14 may generally include routines, objects, components, data structures, and the like that perform particular tasks or implement particular abstract data types. The computer program 14 may be a single program or multiple programs acting in concert, and may be used to denote both applications, services (i.e. programs running in the background), and an operating system.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for selecting a ranker for statistical natural language processing, the system comprising a computer program configured to be executed on a computing device, the computer program including:
 a data store including reference performance data for a plurality of candidate rankers, the reference performance data being calculated based on a processing of test data by each of the candidate rankers; and
 a ranker selector configured to receive an SNLP task and one or more performance targets, and determine a selected ranker from the plurality of candidate rankers based on the SNLP task, the performance target, and the reference performance data.

2. The system of claim 1, wherein the computer program is an application program interface configured to be a communication intermediary between an application program and the ranker selector.

3. The system of claim 1, further comprising a graphical user interface including an SNLP task input tool configured to receive user input of the SNLP task.

4. The system of claim 3, wherein the graphical user interface further includes a performance targets input tool configured to receive user input of the performance targets.

5. The system of claim 3, wherein the graphical user interface further includes an output pane configured to display the selected ranker.

6. The system of claim 3, wherein the graphical user interface further includes a test data input tool configured to receive user input of the test data, a load candidate ranker tool configured to receive user input of one or more candidate rankers, a load reference performance data tool configured to receive user input of reference performance data.

7. The system of claim 3, wherein the graphical user interface further includes a recommend ranker selector configured to receive a user request to determine the selected ranker.

8. The system of claim 1, wherein the one or more performance targets are selected from the group consisting of accuracy, memory footprint, processing time, development time, model sparsity, and model training time.

9. The system of claim 1, wherein the candidate ranker is selected from the group consisting of maximum entropy estimation with $L_2$ regularization ranker, averaged perceptron ranker, boosting ranker, maximum entropy estimation with $L_1$ regularization ranker, and BLasso ranker.

10. The system of claim 1, wherein the SNLP task is formulated as a ranking problem under the framework of a linear model and is selected from the group consisting of parse selection, language model adaptation, word segmentation, part-of-speech tagging, text categorization, text clustering, lexical acquisition, word-sense disambiguation, word class induction, syntactic parsing, semantic interpretation, grammar induction, and machine translation.

11. The system of claim 1, further including a test engine configured to receive the test data and to generate the reference performance data by processing the test data with each of the candidate rankers.

12. A method for selecting a ranker for statistical natural language processing using a computing device, the method comprising:
 providing a plurality of candidate rankers;
 providing reference performance data, the reference performance data being calculated based on a processing of predefined test data by each of the plurality of candidate rankers;
 receiving an SNLP task and one or more performance targets;
 receiving a user request to select a selected ranker from among the plurality of candidate rankers; and
 determining the selected ranker from the plurality of candidate rankers based on the SNLP task, the performance target, and the reference performance data.

13. The method of claim 12, further comprising:
 displaying the selected ranker on a display associated with the computing device.

14. The method of claim 12, wherein the one or more performance targets are selected from the group consisting of accuracy, memory footprint, processing time, development time, model sparsity, and model training time.

15. The method of claim 12, wherein the candidate ranker is selected from the group consisting of maximum entropy estimation with $L_2$ regularization ranker, averaged perceptron ranker, boosting ranker, maximum entropy estimation with $L_1$ regularization ranker, and BLasso ranker.

16. The method of claim 12, wherein the SNLP task is selected from the group consisting of parse selection, language model adaptation, word segmentation, part-of-speech tagging, text categorization, text clustering, lexical acquisition, word-sense disambiguation, word class induction, syntactic parsing, semantic interpretation, grammar induction, and machine translation.

17. The method of claim 12, wherein receiving an SNLP task and one or more performance targets includes receiving an SNLP task via an SNLP task input tool of a GUI of a computer program, and receiving one or more performance targets via a performance targets input tool of the GUI.

18. The method of claim 12, wherein determining the selected ranker from the plurality of candidate rankers includes comparing a measured parameter from the reference performance data for each of the plurality of candidate rankers with a desired parameter from the performance targets.

19. A system for selecting a ranker for statistical natural language processing, the system comprising a computer program executable on a computing device to display a graphical user interface on a display associated with the computing device, the graphical user interface comprising:
 an SNLP task input tool configured to receive user input indicating an SNLP task, a performance targets input tool configured to receive user input indicating one or more performance targets;
 a recommend ranker selector configured to receive user request to determine a selected ranker, based on the SNLP task, performance targets, and stored reference performance data; and an output pane configured to display the selected ranker, upon determination of the selected ranker by the computer program.

20. The system of claim 19, wherein the graphical user interface further comprises:

a load test data tool configured to receive user input of test data;

a load candidate ranker tool configured to receive user input of one or more candidate rankers; and a load reference performance data tool configured to receive user input of reference performance data.

* * * * *